Aug. 20, 1935.  H. H. TIMIAN  2,011,988
MOTOR VEHICLE
Filed April 13, 1932   2 Sheets-Sheet 1
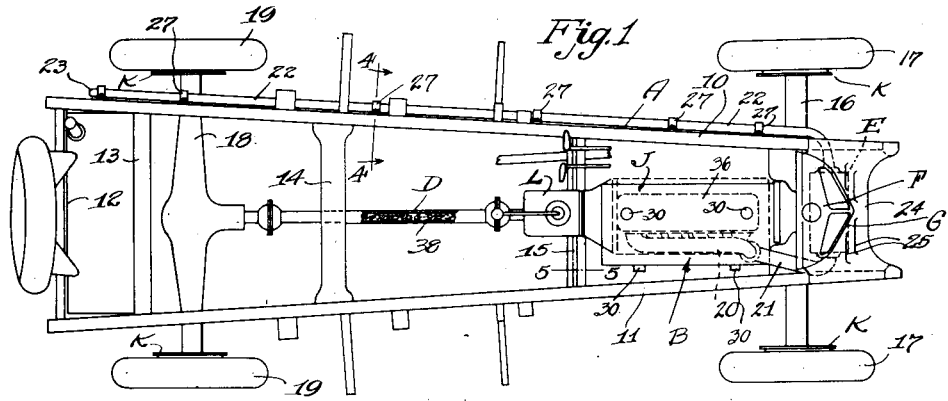
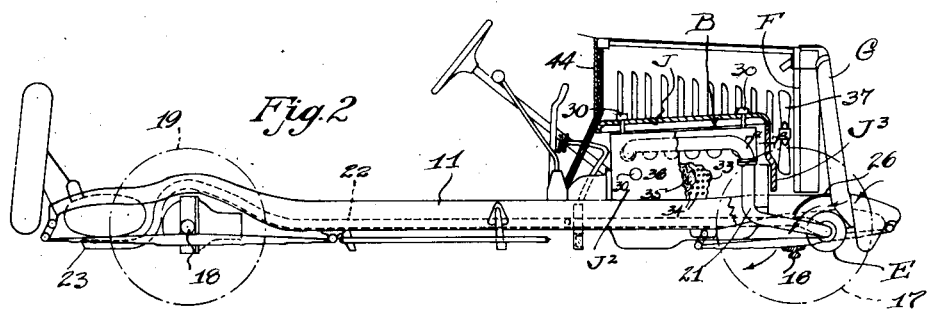
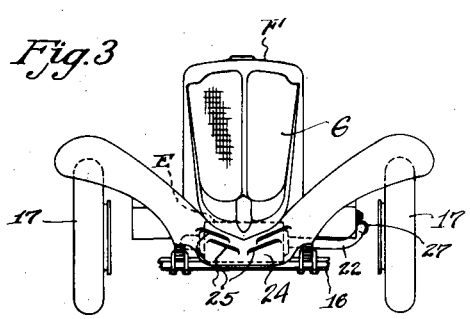
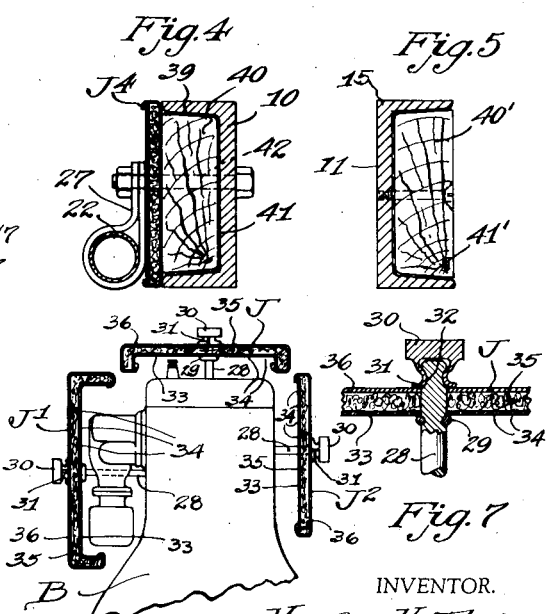
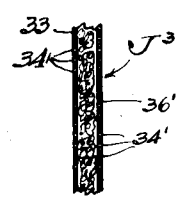
INVENTOR.
Harold H. Timian
BY
ATTORNEY.

Aug. 20, 1935.   H. H. TIMIAN   2,011,988
MOTOR VEHICLE
Filed April 13, 1932   2 Sheets-Sheet 2
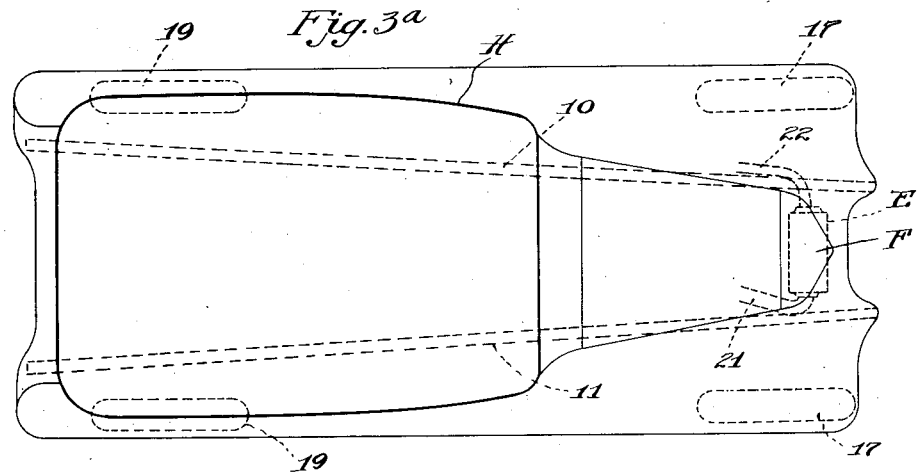
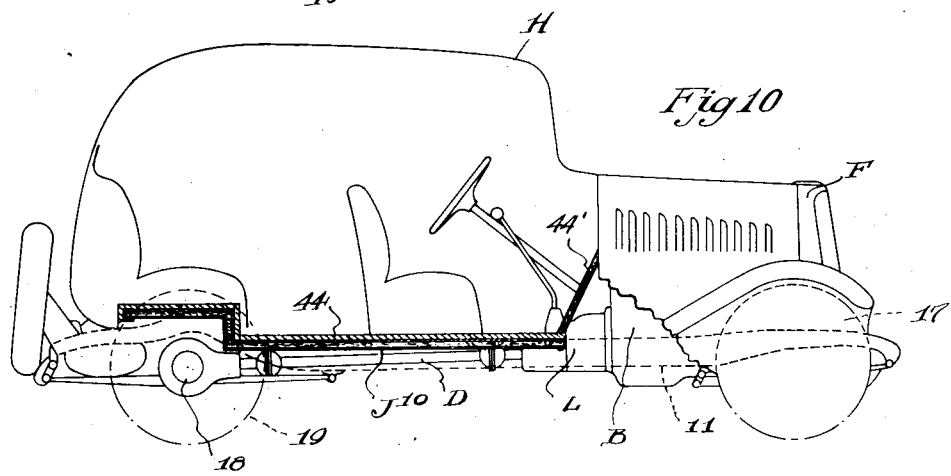
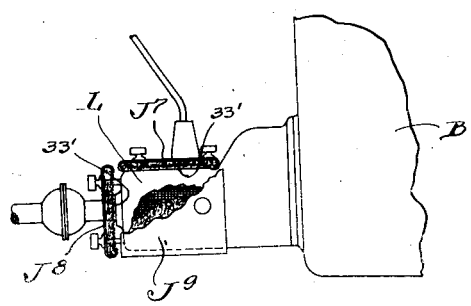
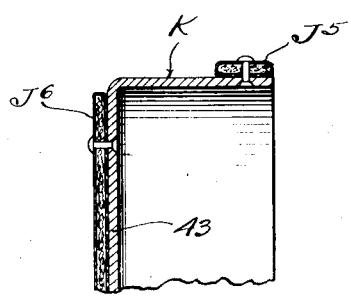
INVENTOR.
Harold H. Timian
BY
ATTORNEY.

Patented Aug. 20, 1935

2,011,988

UNITED STATES PATENT OFFICE 2,011,988

MOTOR VEHICLE

Harold H. Timian, Detroit, Mich., assignor to Continental Motors Corporation, Detroit, Mich., a corporation of Virginia Application April 13, 1932, Serial No. 604,968

5 Claims. (Cl. 180—54)

This invention relates to motor vehicles and has among its objects the provision of improved means for reducing vibrations, noises, and objectionable sounds produced in various parts of the vehicle by reason of the operation of vehicle parts.

One object of my invention resides in the provision of improved means for materially lessening the vibrations and noises arising from operation of the muffler. I have provided means for locating the muffler away from under the vehicle body where it is customarily located. Heretofore muffler resonance caused objectionable vibrations in the vehicle body floor, running board, chassis frame, and other parts and my invention eliminates such vibrations.

A further object of my invention resides in the provision of a chassis frame adapted to have vibration damping characteristics whereby objectionable noises and vibrations ordinarily set up in the chassis are damped.

A further object of my invention resides in the provision of improved means for absorbing and damping objectionable sounds ordinarily emanating from the vehicle engine whereby such sounds are materially damped before reaching the vehicle occupant.

A further object of my invention resides in the provision of means for damping objectionable vibrations and noises ordinarily arising from or set up in various parts of the motor vehicle such as the propeller shaft, cooling fan, transmission, brake drum, and like parts.

Further objects and advantages of my invention will be apparent as this specification progresses reference being had to the accompanying drawings in which:

Fig. 1 is a plan view of a typical motor vehicle chassis,

Fig. 2 is a side elevation view thereof,

Fig. 3 is a front elevation view of the motor vehicle,

Fig. 3ª is a top plan view of the motor vehicle showing the muffler located clear of the body projection, Fig. 4 is a detail sectional view through 4—4 of Fig. 1 illustrating the exhaust pipe connection with my novel chassis frame member, Fig. 5 is a detail sectional view through 5—5 of Fig. 1 illustrating my novel chassis cross frame member, Fig. 6 is a front elevation view of the engine in somewhat diagrammatic form illustrating my sound absorbing devices associated therewith, Fig. 7 is an enlarged detail view showing the removable fastener for a typical sound absorbing device of Fig. 6, Fig. 7ª is an enlarged detail view of a sound absorbing device of modified construction, Fig. 8 is a sectional view through a portion of a typical brake drum illustrating my vibration damping device associated therewith, Fig. 9 is an elevation view of the transmission showing my sound damping means associated therewith, and Fig. 10 is a diagrammatic view through the motor vehicle showing my vehicle body floor having sound damping properties.

Referring to the drawings I have illustrated a motor vehicle in Fig. 1 wherein the motor vehicle chassis A is formed with a pair of longitudinally extending main frame members 10 and 11 and cross frame members 12, 13, 14, 15. Other cross frame members may be provided as desired. The front axle 16 is provided with the usual wheels 17 and the rear axle 18 is provided with wheels 19.

B represents the internal combustion engine for propelling the motor vehicle, L indicating the transmission, D the propeller shaft which transmits the drive to the rear wheels 19. The engine or motor B has exhaust manifold 20 which in the illustrated embodiment of my invention conducts the exhaust gases forwardly and downwardly from the manifold by an exhaust pipe 21 to the muffler E. The muffler is preferably arranged adjacent the forward end of chassis A forwardly of the front axle, and extends transversely with respect to the longitudinally extending main frame members 10 and 11. A pipe 22 conducts the exhaust gases from the muffler and extends longitudinally of the chassis frame A and rearwardly thereof to the outlet 23. I have indicated the usual vehicle radiator for cooling the motor at F and this radiator may have a grille or front housing G, said radiator and grille being located substantially at the front of the vehicle. Extending downwardly from the grille G is a skirt 24 and the muffler E is preferably located rearwardly of the skirt and adjacent thereto and below radiator F forwardly of the front axle assembly as generally illustrated in the drawings. The skirt 24 has one or more louvres 25 adapted to admit air for circulation exteriorly of muffler E and I preferably provide a baffle or deflector 26 between the radiator F and muffler E so as to direct the air stream for cooling the muffler as generally indicated by the arrows in Fig. 2. It will also be noted that the deflector 26 prevents transfer of heat from muffler E to radiator F.

It will be noted that the muffler is located free of the vehicle projection of the vehicle body indicated at H in Fig. 3ª whereby I have avoided the usual objectionable heat reflection from the muffler into the body and I have also avoided transference of vibration from the muffler to the running board, body floor boards and top deck as experienced with mufflers located beneath the vehicle bodies as is now customary in the art. Furthermore by reason of the muffler being located at the forward end of the vehicle I am enabled to provide an air circulation around the muffler whereby it is maintained relatively cool. Where the muffler is located beneath the body as now customary, there is a tendency for stagnant air to surround the muffler and the muffler becomes excessively heated and transfers a large amount of its heat to the body which is objectionable during warm weather. It will be noted that my muffler is located in position to receive a circulation of air from the front wheels 17 which act as fans as they rotate. I have also provided a construction whereby the muffler E may be located relatively near the engine B and wherein the exhaust pipe 22 may be conveniently located on the side of engine B opposite the carburetor and fuel line (not shown but usually located on the same side of the engine as exhaust manifold 20 for an L-head engine). With the exhaust pipe 22 so located, it will be noted that it is removed from the carburetor and fuel line so that it will not produce vapor lock or interference with proper carburetion.

A further feature of my invention resides in locating the exhaust pipe 22 on the outside of frame member 10 as shown in Fig. 4 and also in supporting the pipe 22 at irregular points along the length of frame 10, these points being spaced to dampen the exhaust frequency overlaps which cause reverberation in the exhaust pipe. Thus I have illustrated the pipe 22 supported by brackets 27 and it will be noted that these brackets occur at irregular intervals along the length of main frame 10. By reason of my arrangement of brackets or supporting points, I am enabled to dampen the exhaust pulsations, these anchorages being located opposite the nodes occurring in the exhaust pipe vibration. The frame member 10 is thus prevented from vibrating.

Referring now to Fig. 6 I will describe that phase of my invention which relates to improvements in damping objectionable sounds and noises which emanate from the engine or motor B. For this purpose I have provided an acoustic baffle J which is in the nature of a flat plate assembly adapted to be removably attached adjacent the top of motor B. In Fig. 7 I have shown one of the posts 28 extending upwardly from the motor and provided with a ledge 29 adapted to seat the assembly J, a fastener 30 securing the assembly J in position by reason of the spring fingers 31 which snap into the recess 32 formed in posts 28. The baffle J may be readily removed from the engine by pulling the fasteners 30 from posts 28 and then lifting the baffle from the posts.

The baffle J may be formed of any suitable construction adapted to break up and dissipate the sound waves which emanate from engine B and for purpose of illustration I have provided a metallic plate 33 facing the motor, this plate having a plurality of perforations 34 extending therethrough and adapted to break up the sound waves. Rearwardly of plate 33 I have provided a sound absorbing material 35 in the nature of asbestos, cotton, gauze, or other suitable material. A light metallic cover 36 encases the material 35 so as to form the assembly J. If desired the plate 33 may be formed of fine mesh wire screening such as illustrated in Fig. 9 and referred to hereinafter.

If desired, a plurality of the acoustic baffles may be provided for the sides, front and rear of motor B so as to substantially house the motor. Thus I have provided similar baffle assemblies J' and J² at the sides of the motor and referring to Figs. 2 and 7ª I have illustrated a third baffle J³ forwardly of the motor and intermediate the motor and the usual cooling fan 37. The baffle J³ may differ from the companion baffles by having the outer plate 36' perforated at 34' in a similar manner to the perforations 34 of the inner plate 33 as shown in Fig. 7ª. By reason of this construction I am enabled to dampen much of the noise emanating from fan 37 as well as absorbing and damping noises emanating forwardly from motor B.

Referring now to Fig. 1 I have illustrated the propeller shaft D in the form of a hollow tube and within the tube I have positioned a suitable sound absorbing material 38 similar to the material 35. By packing the propeller shaft D in this manner I have dampened vibrations occurring in the propeller shaft both in regard to those vibrations originating in the propeller shaft and those vibrations which are transferred to it from other sources.

Referring now to Figs. 4 and 5 I have illustrated my improved frame construction for damping vibrations and noises which tend to occur in the main frame members 10 and 11 as well as in the cross frame members. In Fig. 4 for example the main frame member 10 is shown in the form of a channel beam providing a recess 39 adapted to receive a sound absorbing and vibration deadening insert 40 illustrated as a block of wood extending longitudinally of the frame member 10. Intermediate the wood 40 and metallic frame member 10 I preferably provide a lining of acoustic material 41 adapted to form a bond between the wood and frame and also adapted to further absorb and deaden any vibrations. This lining may be in the nature of tar or creosote. In Fig. 4 one of the brackets 27 is illustrated as being connected to frame member 10 by reason of bolt 42 and in order to further insulate the exhaust pipe 22 from frame member 10 I have provided the acoustic baffle J⁴ intermediate frame member 10 and bracket 27. It will be understood that the baffle J⁴ may extend longitudinally of frame member 10 or else it may be positioned at the points of brackets 27 as illustrated in Fig. 1. The baffles J⁴ may be similar in construction to the baffle J described in connection with Fig. 7.

In Fig. 5 I have illustrated a typical cross frame member 15 which is channel shaped to receive the sound absorbing insert 40' illustrated as a wood block and the tar or creosote seal 41' is also provided in similar manner to the frame and block assembly described in connection with Fig. 4. The block 40' preferably extends toward motor B so as to absorb vibrations and noises emanating from the motor.

By reason of my chassis frame construction with the vibration deadening means, I have provided an assembly which absorbs a great amount of motor vibrations and also noises and vibrations emanating from other parts of the motor vehicle. My construction will permit a more rigid assembly of the motor vehicle parts which are connected to the chassis frame such as the motor itself, the body, and other parts.

Referring to Fig. 8 I have illustrated in cross section one of the typical brake drums K which are shown in Fig. 1 in association with the front and rear vehicle wheels 17 and 19 respectively. In order to deaden vibrations set up in the brake drums I have provided an acoustic baffle assembly $J^5$ around the peripheral edge of the brake drum and if desired a second baffle $J^6$ may be located on the outer face of the hub portion 43 of brake drum K. It will be understood that the construction of baffles $J^5$ and $J^6$ may be similar to that described in detail in connection with the baffle J in Fig. 7.

Referring to Fig. 9 the motor B is shown with the usual transmission L which is substantially enclosed by reason of a plurality of acoustic baffle assemblies somewhat similar to the baffles described in connection with Fig. 6 as substantially enclosing motor B. Thus in Fig. 9 the acoustic plate or baffle $J^7$ is secured across the top of transmission L and baffles $J^8$ and $J^9$ are located rearwardly of transmission L and to one side thereof as shown. It will be understood that a similar baffle is located on the other side of transmission L. It is not necessary to provide a baffle across the bottom of transmission L inasmuch as the sound waves emanating downwardly are directed to the ground. It will be understood that the baffle assemblies for transmission L may be formed similarly with the assembly J described in connection with Fig. 7 with the exception that in Fig. 9 the baffles are shown as having their inner plate 33' as being formed by a generally divided wire mesh or screen instead of a metallic plate with punched holes such as illustrated at 33 in Fig. 7. By reason of the baffles associated with transmission L I am enabled to dampen noises and vibrations emanating from transmission L.

Referring to Fig. 10, I have illustrated a further feature of my invention in connection with the body H of the motor vehicle. This body has a floor wall 44 and an extension thereof 44', the former being adapted to form the floor of the body and the latter forming the usual dash. These floor portions 44 may be fixed with an acoustic baffle $J^{10}$ which may be formed in similar fashion to the baffle J described in connection with Fig. 7. The acoustic baffle $J^{10}$ is adapted to absorb objectionable noises and vibrations which emanate from the various vehicle parts and are ordinarily transmitted to the vehicle body.

My invention provides a number of means for emanating objectionable noises and vibrations in motor vehicles and I desire it understood that the various means which I have described in detail for various parts of the motor vehicle need not be used all with the same vehicle and my invention is not limited to such combinations. Any one of my improvements referred to hereinbefore is adapted to materially improved the acoustic characteristic of a motor vehicle and its general riding qualities. It is also not my intention to limit my invention to the particular combination of parts shown and described or the particular materials which I have referred to for purpose of illustration as various modifications will be apparent from my disclosure.

What I claim as my invention is:

1. In a motor vehicle having a motor and cooling radiator therefor positioned at the front of the vehicle, a muffler positioned below said radiator and forwardly of the motor.

2. In a motor vehicle having a motor, a radiator and grille associated therewith, said radiator and grille located substantially at the front of the vehicle, a muffler positioned substantially adjacent said grille and rearwardly thereof in a position forwardly of the motor.

3. In a motor vehicle having a radiator and grille associated therewith, said radiator and grille located substantially at the front of the vehicle, a muffler positioned substantially adjacent said grille and rearwardly thereof and air deflecting means intermediate the radiator and muffler.

4. In a motor vehicle having a radiator and housing therefor located substantially at the front of the vehicle, a skirt extending downwardly from said housing, and a muffler positioned rearwardly of said skirt, said skirt having one or more louvres for admitting air to the muffler exterior.

5. In a motor vehicle having a chassis frame and a muffler carried transversely thereby substantially at one end thereof, and an exhaust gas pipe connected with one end of said muffler and extending longitudinally of said frame, and means for supporting said exhaust pipe from said frame with the pipe positioned laterally outwardly thereof.

HAROLD H. TIMIAN.